United States Patent [19]

Riemer

[11] Patent Number: 5,514,304

[45] Date of Patent: * May 7, 1996

[54] PACKING FOR A MATERIAL AND HEAT EXCHANGE COLUMN

[76] Inventor: Helmut Riemer, Rua Sarkis Guludjian, 23, Osasco SP, Sao Paulo, Brazil

[*] Notice: The portion of the term of this patent subsequent to Jul. 14, 2009, has been disclaimed.

[21] Appl. No.: 891,292

[22] Filed: May 29, 1992

Related U.S. Application Data

[62] Division of Ser. No. 730,024, Jul. 12, 1991, Pat. No. 5,130,062, which is a continuation of Ser. No. 469,588, May 18, 1990, abandoned.

[30] Foreign Application Priority Data

Aug. 11, 1988 [BR] Brazil ............... PI88042029

[51] Int. Cl.$^6$ ................................ B01F 3/04
[52] U.S. Cl. ................ 261/97; 261/DIG. 72
[58] Field of Search ............... 261/97, DIG. 72, 261/94

[56] References Cited

U.S. PATENT DOCUMENTS

| | | | |
|---|---|---|---|
| 2,055,162 | 9/1936 | Weber | 261/DIG. 72 |
| 2,630,305 | 3/1953 | Scofield et al. | 261/94 |
| 2,911,204 | 11/1959 | Malone | 261/DIG. 72 |
| 3,430,934 | 3/1969 | Weishrupt | 261/DIG. 72 |
| 3,957,931 | 5/1976 | Ellis et al. | 261/DIG. 72 |

*Primary Examiner*—Tim R. Miles

[57] ABSTRACT

The invention relates to a packing (2) for a material and heat exchange column (1), in which a gas phase and a liquid phase are brought into contact with one another, said packing comprising a multiplicity of identical packing elements (4) which are substantially in the form of a circular hollow cylinder whose annularly extending wall (6) is outwardly concave and inwardly convex and forms two outer edges (11) extending therearound, said hollow cylinder having a high ratio of outside diameter (D) to height (H). In order to reduce the pressure drop and to increase capacity and effectiveness, provision is made for the packing (2) to consist of a multiplicity of superimposed layers (3) of packing elements (4) which lie flat, are distributed randomly in each layer (3), and internally have a free passage cross-section, and in which the ratio of outside diameter (D) to height (H) is from about 6:1 to about 10:1.

7 Claims, 1 Drawing Sheet

PACKING FOR A MATERIAL AND HEAT EXCHANGE COLUMN

This is a division of application Ser. No. 07/730,024 filed Jul. 12, 1991, now U.S. Pat. No. 5,130,062, which is a continuation of Ser. No. 07/469,588 filed May 18, 1990, now abandoned.

The invention relates to a packing for a material and heat exchange column in which a gas phase and a liquid phase are brought into contact with one another, said packing comprising a multiplicity of identical packing elements which are substantially in the form of a circular annular hollow cylinder whose annularly extending wall is outwardly concave and inwardly convex and forms two outer edges extending therearound, said hollow cylinder having a high ratio of outside diameter to height.

In material and heat exchange columns in which a gas phase is brought into contact with a liquid phase a transfer of material and heat occurs, for example absorption with the transfer of a component from the gas phase to the liquid phase, desorption with the transfer of a component in the opposite direction, or rectification in which components are transferred in both directions. Since temperature differences usually exist, heat transfer also takes place at the same time, for which reason material exchange columns are always also simultaneously heat exchange columns. The gas phase is usually allowed to flow through the column counter-currently to the liquid phase, and the parallel flow principle is applied only rarely (while crosscurrent flow is employed only in cooling towers used for heat exchange). The columns are provided with built-in elements whose purpose is to ensure a high rate of exchange between the gas phase and the liquid phase (efficiency), a high throughput (capacity) for the two phases and the lowest possible pressure drop.

Built-in elements for material and heat exchange columns may be in the form of disordered or ordered packings. Ordered packings preferably consist of coarsely folded plates which are arranged with their combs crossing at an angle to one another and to the axis of the column, and which are provided with a fine structure in the form of grooves and holes or the like. Their manufacture and their arrangement in the column are relatively expensive.

Disordered packings consist of individual packing elements which are simply poured into the column. In comparison with ordered packings, therefore, the arrangement in the column is substantially simplified. Packing elements of this kind include raschig rings, which have been known for a long time and which have a ratio of diameter to height of about 1:1. A further development thereof consists of so-called pawl rings having small tongues which extend inwards and leave corresponding holes and which have improved capacity considerably. By reducing the ratio between diameter and height to 3:1, with the omission of one row of tongues, pawl rings were able to reduce dead regions.

Development was similar in the case of roof-shaped, semicylindrical, saddle-shaped or similarly shaped packing elements which are likewise poured into the column in a disordered manner, and which were provided with increasingly complicated surface shapes in the form of holes, ribs, grooves, projections, depressions, tongues and the like.

Because of their structure, disordered packings show a relatively high pressure drop in the axial direction of the column, which impairs the capacity of the packing and the effectiveness of the exchange of material.

This also applies to packings made from packing elements of the kind described in U.S. Pat. No. 3,957,931. These packing elements may be in the form of circular cylinders, optionally having a concave outer surface, and be provided with inwardly directed ribs, which may also project in the axial direction relative to the cylindrical part.

The ribs are intended to prevent the wedging of the packing elements in one another when they are poured in, whereby the pressure drop is reduced because of the resulting partial alignment of the packing elements relative to one another. At least in the case of packing elements made from metal by cold-working, the provision of ribs is expensive, and when the packing elements are poured into a column the resulting packing is not a well ordered structure but is random and disordered, containing packing elements lying both flat and at an angle and standing vertical, thus still giving rise to a relatively high pressure drop.

The object of the invention is to provide a packing of the type described in the preamble, which leads to a reduced pressure drop and to increased capacity and effectiveness of the exchange of material.

This object is solved in that the packing consists of a multiplicity of superimposed layers of packing elements which lie flat, are distributed randomly in each layer and internally have a free passage cross-section, and in which the ratio of outside diameter to height is from about 6:1 to about 10:1.

The packing elements used consist of a ring similar to a bicycle wheel rim, with a relatively high diameter to height ratio, so that packing elements falling freely onto a flat support assume a position in which they lie flat and rest on an edge extending around them. The probability of their assuming a vertical position when thus dropped is extremely slight, since this position constitutes the state of unstable equilibrium which would be overcome by even the slightest vibration or the like, for example the impingement of other falling packing elements. Through the gradual introduction and distribution of packing elements into a column it is thus possible to construct a packing which is formed of superimposed layers of packing elements lying flat and which is thus so to speak ordered in the axial direction of the column, while the packing elements in a layer are distributed randomly and disorderly and are practically always staggered relative to those lying immediately above and below them. With a packing of this kind the pressure drop is substantially reduced in comparison with a completely disordered packing, so that the capacity and effectiveness of the material exchange can be greatly improved. With the same capacity and effectiveness, the packing volume and thus also the weight of the packing are thereby reduced.

In addition, the packing is produced with the aid of packing elements which are easy to manufacture and with relatively low labour costs during the column filling stage.

Further developments and advantages of the invention can be seen in the following description and in the subclaims.

The invention is explained more fully below with reference to the examples of embodiment illustrated by way of example in the accompanying drawings.

Figure 1:
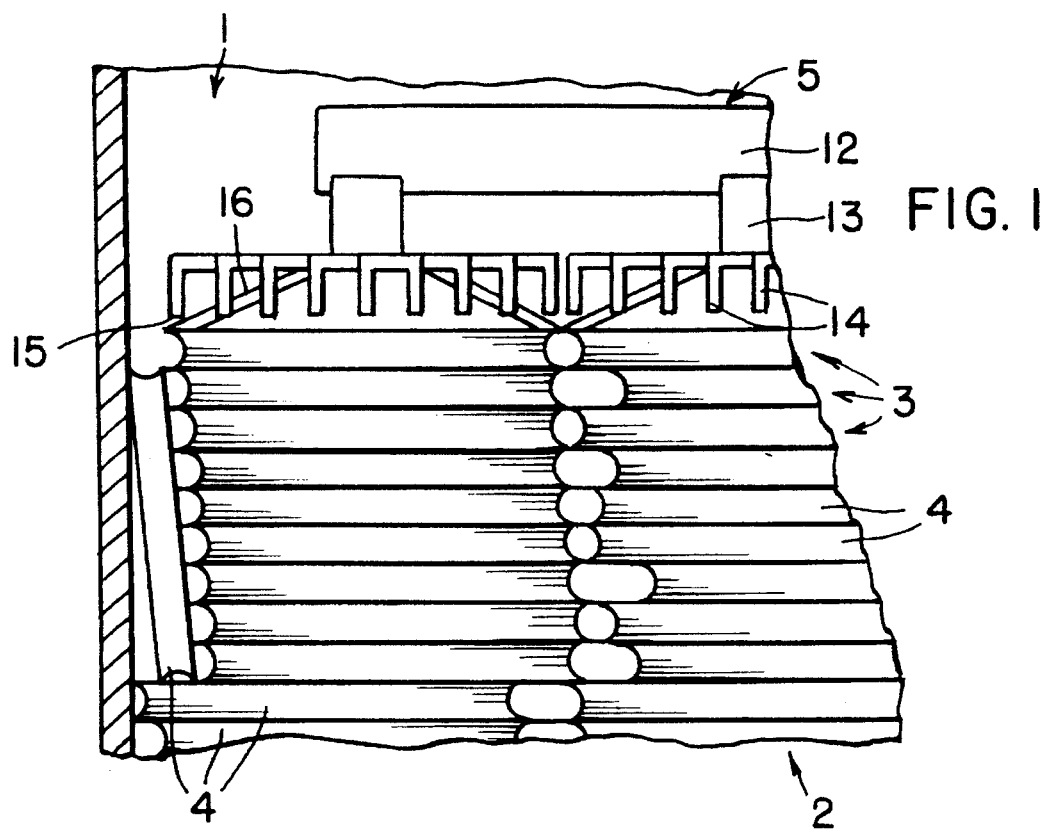
FIG. 1 shows part of a packing in a material and heat exchange column, in which rings staggered in the plane of the drawing are shown while intersected rings are omitted for the sake of clarity.
Figure 2:
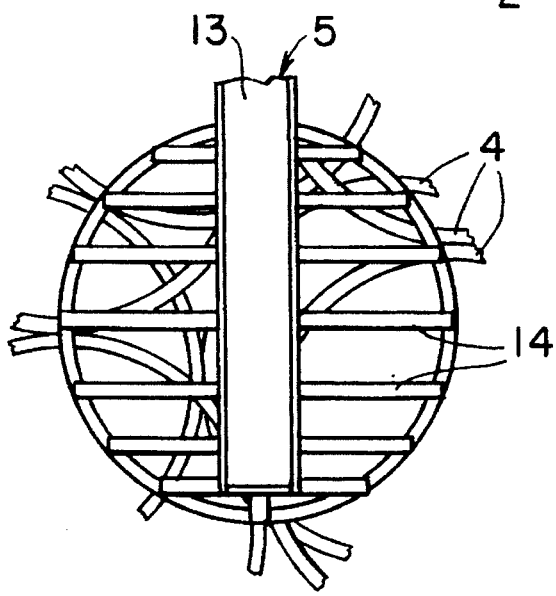
FIG. 2 is a partial plan view of the packing shown in FIG. 1.

According to FIG. 1, a column 1 contains a packing 2 carried by a suitable base (not shown) and consisting of superimposed layers 3 of packing elements 4. A liquid distributor 5 is disposed above the packing 2.

The packing elements 4 are in the form of a circular annular hollow cylinder, the wall 6 of which has a substantially uniform thickness and is provided with a concave outer side 7 and a convex inner side 8 which extend around it. In addition, the ratio of the outside diameter D to the height H of the hollow cylinder is so great that the packing element 4, when poured into a column 1, assumes a position in which it lies flat on the base of the column or on a layer of identical packing elements 4, as illustrated in FIG. 1. The ratio of the outside diameter D to the height H of the hollow cylinder is preferably approximately between 6:1 and 10:1.

If packing elements 4 of this kind are carefully filled into a column 1 and spread out, a packing 2 of superimposed layers 3 of packing elements 4 lying flat is obtained. Although a packing 2 of this kind has an irregular arrangement of the packing elements 4 in each layer 3, with longer or shorter distances between individual packing elements 4, while however individual packing elements 4 will also be in point contact with each other, nevertheless the packing 2 is ordered in the direction of the axis of the column.

The effect is thereby achieved that the aerodynamic resistance is reduced, and thus the pressure drop inside the column 1 is lowered, in comparison with a completely disordered packing. As a result of the partially ordered packing achievable with the packing elements 4, moreover, with the same specific surface the packing elements 4 take up a smaller space, that is to say the packing factor is reduced or the capacity of the packing 2 can be substantially increased with the packing volume unchanged.

The inwardly curved wall 6 of the packing element 4 provides the latter with adequate strength and in addition serves to ensure that it is practically impossible for a packing element 4 to be jammed in an inclined or vertical position in a horizontal packing element 4 and thus, at least in places, prevent the formation of layers 3, but in such a position instead would be in unstable equilibrium and would therefore be tipped over into the horizontal position, corresponding to stable equilibrium, when other packing elements 4 are spread out or fall down.

It is expedient for the section of the wall 6 to have the shape of a sector of a circular ring, particularly of a semicircular ring, although for example concavities having the shape of part of an oval are also possible.

The inwardly curved wall 6 also brings about a corresponding increase of surface area, which has the effect of reducing pressure drop and increasing effectiveness and capacity.

In addition, the inwardly curved wall 6 has the consequence that the liquid phase flows off without forming accumulations of liquid, so that the residence time of the liquid phase in the packing 2 is correspondingly short. In the case of substances having a tendency towards polymerization, it is thus possible to avoid polymerization in the column 1. Moreover, solids in suspension or otherwise introduced are not retained by the liquid phase.

In a packing 2 according to FIG. 1 the gas phase always flows from bottom to top in the axial direction of the column 1, and thus substantially in the axial direction of the individual packing elements 4, while the latter give rise to a pressure difference between the region close to the outer side 7 and the region close to the inner side 8, the static pressure $p_1$ on the outer side 7 being higher than the static pressure $p_2$ on the inner side 8 (similarly to an aircraft wing). As a result, a negative pressure is formed in the interior of each individual packing element 4, which on the inside has a free passage cross-section, that is to say is without inwardly directed ribs or similar fittings. This leads to intensified gas turbulence and thus to corresponding crossmixing of the gas phase, particularly as each individual packing element 4 is slightly staggered relative to the neighbouring element in the layer above and below it.

Since the liquid phase passes, at least in part, along the bottom edge of the packing elements 4 until it impinges on the top edge of a packing element 4 situated therebelow, this brings about a mixing, in the direction transverse to the axis of the column, of the downwardly flowing liquid phase. A substantially uniform composition of the liquid phase is thereby achieved over the cross-section of the column.

The cross mixing of the gas and liquid phases has the effect that the driving gradient of temperature and/or concentration can be utilized in optimum manner.

Accurate horizontal adjustment of the packing 2, or of the packing elements 4, is not necessary; a slight slope leads to a corresponding outflow of the liquid phase.

The thickness of the wall 6 may for example be approximately between 0.2 and 5.0 mm, while the outside diameters D are generally selected within the range between 10 and 300 mm. Without loss of effectiveness, the minimum ratio of column diameter to packing element diameter can then amount to about 4.6:1, as compared with a minimum of 8 to 12:1 for the customary disordered packings, so that packing elements 4 having a relatively large diameter D can be used without disadvantage, particularly for laboratory apparatus.

With packing elements 4 having a smaller diameter D it is found that some of these are supported in a vertical or inclined position against the walls of the column. In the case of columns 1 of smaller diameters, in which a great deal of liquid normally flows down along the wall of the column, this can be advantageously exploited, since they guide the liquid from the wall into the interior of the column. For this purpose it is also possible for packing elements 4 to be accordingly arranged to stand along the column wall, as illustrated in FIG. 1.

Figure 3:
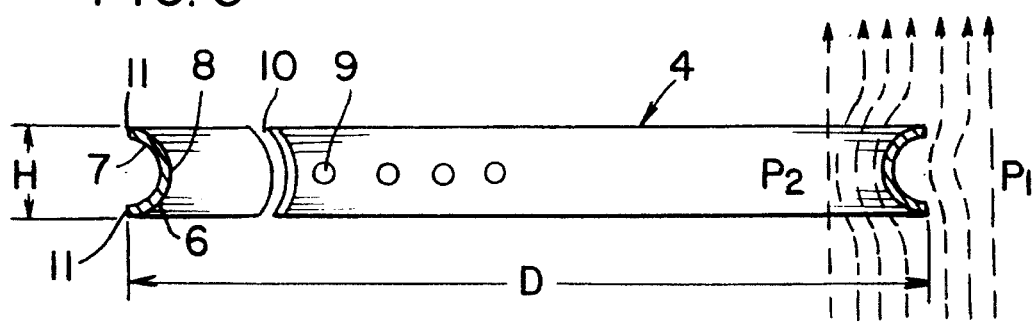
FIG. 3 shows one form of construction of a packing element for the packing shown in FIG. 1.

The packing elements 4 may be made of various materials, for example metal, such as carbon steel, stainless steel, titanium, copper, brass, aluminum or the like, which is expediently cold-worked, or of thermoplastic material such as polypropylene, polyvinyl chloride, polyethylene or the like, or of ceramics, rubber or glass. The starting material used for their production may be provided, before, during or after their shaping, with a coarse structure, for example so as to form gas passage openings 9 (FIG. 3) or the like which are not normally flooded by the liquid phase, and/or with a fine structure in the form of grooves, protuberances, depressions, small holes or the like, the formation of these structures depending on the type of shaping process used for the packing elements 4. The packing element 4 may also be made from a woven material, for example a woven wire material.

Particularly in the case of packing elements 4 of metal, portions of a channel-shaped section or of a flat strip may each be bent into a circular ring, the concavity optionally being formed at the same time, while a narrow gap 10 (FIG. 3) can be formed between the opposite ends, the width of this gap being substantially smaller than the height H of the packing element 4 so that another packing element 4 cannot be jammed or caught in it during the filling of the column 1.

The ends of the portion of section bent into a circular ring may however also be joined together, for example by riveting, soldering, adhesive bonding and the like.

Because of the outwardly concave wall 6 the packing element 4 has two edges 11 extending around it, one of which may be slightly set back relative to the other; that is to say the diameters of the two edges 11 will be slightly different, so that the falling over of the packing elements 4 into a flat position will be additionally assisted. The difference in diameter may be so great that the projection of the centre of gravity of the packing element 4, in its substantially vertical position, onto a support would lie outside its standing surface.

The liquid distributor 5 in the embodiment illustrated comprises a supply channel 12 for the liquid phase, which overflows therefrom into distributor channels 13. The distributor channels 13 are provided on their bottom side with a row of outlet pipes 14 which have outlet openings 15. The outlet pipes 14 are arranged in groups in such a manner that their outlet openings 15 are arranged on a circle corresponding to a packing element 4 disposed therebeneath in the uppermost layer 3 of the packing 2. The liquid passing out of the outlet openings 15 is thereby directed onto the packing elements 4 in the top layer 3 and cannot fall freely over an indeterminate distance as a jet through the packing 2. In order to secure the alignment of the packing elements 4 in the top layer 3 in relation to the groups of outlet pipes 14 whose outlet openings 15 are arranged in a circle, the packing elements 4 in the top layer 3 may be connected by struts 16 or the like, so that the top layer 3 of the packing 2 can be inserted into the column 1 together with the liquid distributor 5.

The top layer 3 of the packing 2 may instead also consist of packing elements 4 joined together, a packing element 4 of the first layer 3 expediently being disposed under each outlet opening 15.

The top layer 3 forming a unit may at the same time form a holding down means for the packing 2, in order to prevent the latter from being lifted under an excessive gas load. The liquid distributor 5, by itself or in conjunction with the top layer 3, may also form the holding down means, or they may both be components of the holding down means.

In the case of packing elements 4 having a correspondingly small diameter the outlet openings 15 or the outlet pipes 14 usually cannot be formed into groups, but it is expedient at least to allocate to each packing element 4 an outlet opening 15 which delivers onto said packing element 4 in the top layer 3 the liquid phase discharged by it.

I claim:

1. A packing element of circular shape defining an uninterrupted passage for passage of a gas phase therethrough, said element having an annular wall defining an outwardly concave shape, an inwardly convex shape and having a ratio of outside diameter to height of from 6 to 1 to 10 to 1.

2. A packing element as set forth in claim 1 wherein said wall is of uniform thickness.

3. A packing element as set forth in claim 1 wherein said wall has a cross-section in the shape of part of an oval.

4. A packing element as set forth in claim 1 wherein said wall has a thickness of from 0.2 to 5.0 millimeters.

5. A packing comprising a plurality of vertically disposed layers, each layer having a plurality of horizontally disposed packing elements disposed therein in side-by-side relation, each said packing element being of circular hollow cylindrical shape defining an uninterrupted vertical passage for passage of a gas phase therethrough and having an annular wall defining an outwardly concave shape and an inwardly convex shape, each said packing element having a ratio of outside diameter to height of from 6 to 1 to 10 to 1.

6. A packing as set forth in claim 5 wherein said packing elements of each layer are vertically offset from said packing elements of an adjacent layer.

7. A packing as set forth in claim 5 wherein said packing elements in each layer are connected to each other.

* * * * *

UNITED STATES PATENT AND TRADEMARK OFFICE
CERTIFICATE OF CORRECTION

PATENT NO. : 5,514,304
DATED : May 7, 1996
INVENTOR(S) : Helnut Riemer

It is certified that error appears in the above-indentified patent and that said Letters Patent is hereby corrected as shown below:

On title page, add the following:

[73] Assignee: Sulzer Brothers Limited
                            Winterthur, Switzerland Signed and Sealed this Thirty-first Day of December, 1996

*Attest:*

BRUCE LEHMAN

*Attesting Officer*      *Commissioner of Patents and Trademarks*